(No Model.)

J. E. NITSCHE & A. KOWALEWSKY.
COMBINED SAW BUCK AND DRAG SAW.

No. 359,936. Patented Mar. 22, 1887.

Witnesses.
Robert Emmett,
Jo. L. Coombs

Inventors.
John E. Nitsche
August Kowalewsky.
By James L. Norris.
Atty.

UNITED STATES PATENT OFFICE.

JOHN EMIL NITSCHE AND AUGUST KOWALEWSKY, OF WACO, TEXAS.

COMBINED SAW-BUCK AND DRAG-SAW.

SPECIFICATION forming part of Letters Patent No. 359,936, dated March 22, 1887.

Application filed January 4, 1887. Serial No. 223,406. (No model.)

*To all whom it may concern:*

Be it known that we, JOHN EMIL NITSCHE and AUGUST KOWALEWSKY, citizens of the United States, residing at Waco, in the county of McLennan and State of Texas, have invented new and useful Improvements in Combined Saw-Bucks and Drag-Saws, of which the following is a specification.

This invention relates to sawing-machines; and it consists in the combination, with an ordinary saw-buck, of a drag-saw detachably connected with a swinging arm that is laterally adjustable on one of the cross-pieces of the saw-buck.

Figure 1:
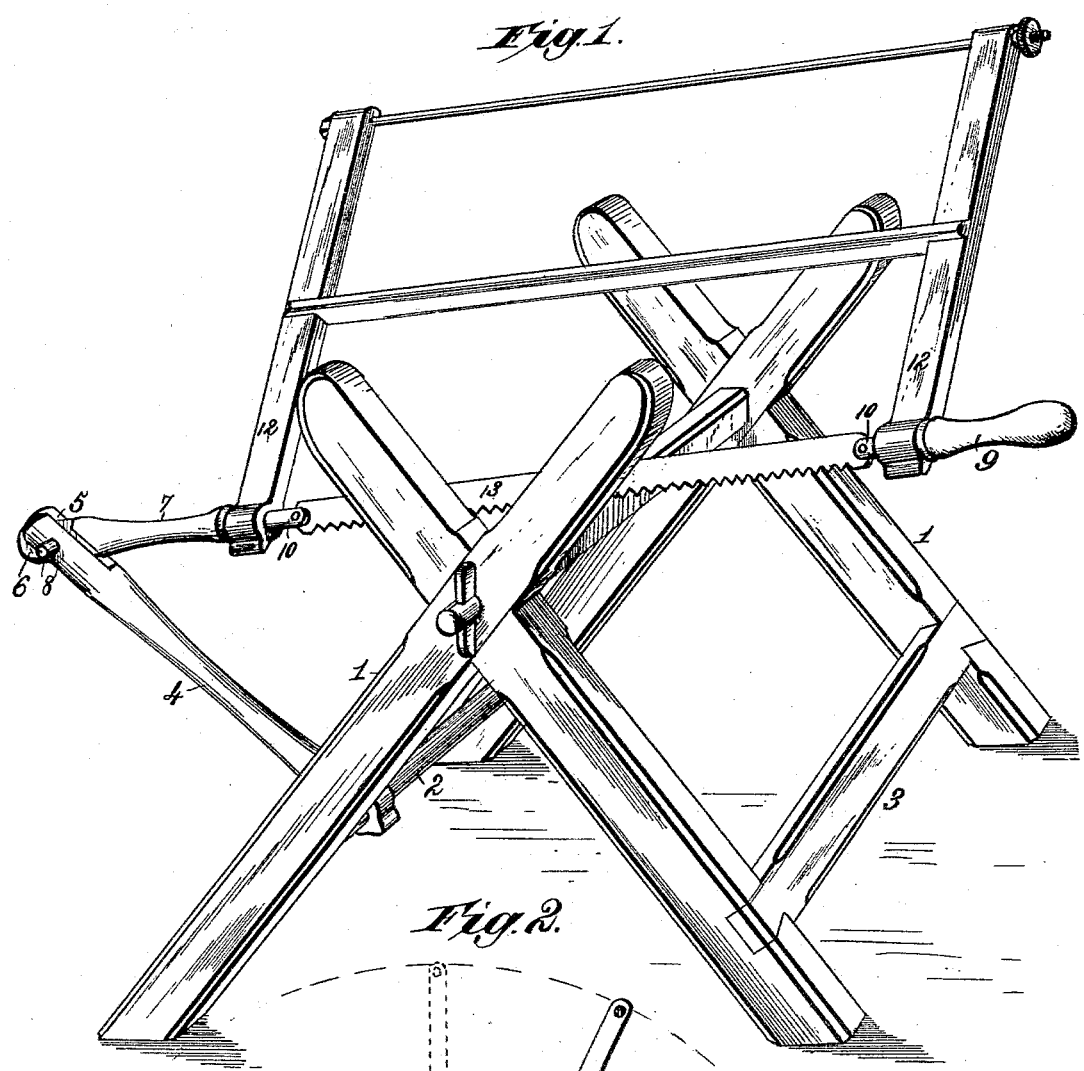
Figure 2:
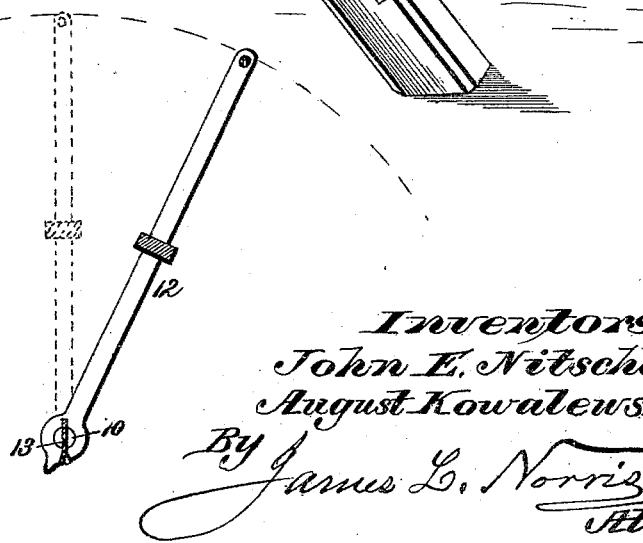

In the annexed drawings, illustrating the invention, Figure 1 is a perspective view of our improved sawing-machine. Fig. 2 is a transverse section of the saw and its pivoted frame.

Referring to these drawings, the numeral 1 designates a saw-buck of ordinary construction provided, as usual, with cross-pieces or braces 2 and 3 near its base. The forward cross-piece, 2, or one farthest from the operator, is made cylindrical, and supports a swinging arm, 4, that is pivoted on said cross-piece in such a manner as to be movable laterally thereon. In the upper end of the swinging arm 4 is a slot, 5, that receives a tenon, 6, on the forward end of the front saw-carrier, 7, a detachable pivot-pin, 8, being passed through said tenon and slotted arm. The front saw-carrier, 7, and the rear carrier or handle, 9, are each formed with a reduced cylindrical portion or spindle, 10, on which are pivoted the opposite ends of the upper saw-frame, 12, which may be of any suitable or ordinary construction. The saw-carriers 7 and 9 are each slitted longitudinally through their spindle portions 10, to receive the ends of the saw-blade 13, which is securely riveted in said carriers.

It will be observed that the swinging arm 4, being loosely mounted on the cross-brace 2, can be readily moved from side to side of the saw-buck according to the length of the log and the point where it is to be cut. By withdrawing the pivot-pin 8 the saw-frame can be detached from the swinging arm 4, if required.

In operation, the saw-blade 13 will always pass vertically through the log without tendency to turn or twist therein even if the saw-frame 12 is not perpendicular. This is owing to the pivotal connection of the saw-frame 12 with the saw-carriers 7 and 9, which enables the saw to travel in a straight vertical line, as shown in Fig. 2, notwithstanding any lateral inclination of the saw-frame.

What we claim as our invention is—

1. The combination, with a saw-buck and drag-saw, of a swinging arm having its upper end pivotally connected with the forward end of the saw-frame and its lower end pivoted and laterally movable on a forward cross-piece of the saw-buck, substantially as described.

2. The combination of a saw-buck, a laterally-movable arm pivoted on a forward cross-piece of said saw-buck, a saw-blade, carriers or handles attached to the ends of the saw-blade, one of said carriers being pivotally connected to the upper end of the laterally-movable and pivoted arm, and a saw-frame pivotally mounted on the saw-carriers, substantially as described.

3. The combination of the saw-buck 1, having cross-piece 2, the swinging arm 4, pivoted to and laterally movable on said cross-piece, the upper end of said arm being provided with a slot, 5, the saw 13, the saw-carriers 7 and 9, having spindles 10, the forward carrier being provided with tenon 6, and the saw-frame 12, pivotally mounted on the spindles of the saw-carriers, substantially as described.

In testimony whereof we affix our signatures in presence of two witnesses.

JOHN EMIL NITSCHE.
AUGUST KOWALEWSKY.

Witnesses:
CHARLES RAST,
E. M. EWING.